(12) United States Patent
Gold et al.

(10) Patent No.: US 7,360,209 B2
(45) Date of Patent: *Apr. 15, 2008

(54) OBJECT PROCESS GRAPH APPLICATION CONTROLLER-VIEWER

(75) Inventors: Steven Allen Gold, Madison, CT (US); David Marvin Baker, Branford, CT (US); Vladimir Gusev, Guilford, CT (US); Hongping Liang, Woodbridge, CT (US)

(73) Assignee: GraphLogic Inc., Branford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/908,653

(22) Filed: May 20, 2005

(65) Prior Publication Data

US 2006/0015857 A1 Jan. 19, 2006

Related U.S. Application Data

(60) Provisional application No. 60/588,465, filed on Jul. 16, 2004.

(51) Int. Cl.
*G06F 9/44* (2006.01)
*G06F 9/45* (2006.01)
*G06F 3/00* (2006.01)

(52) U.S. Cl. ............... 717/168; 717/106; 719/318; 719/328

(58) Field of Classification Search ............ None
See application file for complete search history.

(56) References Cited

U.S. PATENT DOCUMENTS

| | | | |
|---|---|---|---|
| 5,295,256 A | 3/1994 | Bapat | 395/500 |
| 5,504,917 A * | 4/1996 | Austin | 345/522 |
| 5,768,586 A * | 6/1998 | Zweben et al. | 713/100 |
| 5,801,687 A * | 9/1998 | Peterson et al. | 715/500.1 |
| 6,163,776 A | 12/2000 | Periwal | 707/4 |
| 6,292,803 B1 | 9/2001 | Richardson et al. | 707/102 |
| 6,314,559 B1 | 11/2001 | Sollich | |
| 6,425,016 B1 * | 7/2002 | Banavar et al. | 719/310 |
| 6,449,657 B2 | 9/2002 | Stanbach, Jr. et al. | 709/245 |
| 6,477,439 B1 * | 11/2002 | Bernaden et al. | 700/103 |

(Continued)

FOREIGN PATENT DOCUMENTS

CA 2 256 931 A1 6/2000

(Continued)

OTHER PUBLICATIONS

Borger, Egon; Cavarra, Alessandra; Riccobene, Elvinia; "Modeling the Meaning of Transitions from and to Concurrent States in UML State Machines", pp. 1086-1091, ACM 2003, retrieved Aug. 3, 2006.*

(Continued)

*Primary Examiner*—Mary Steelman
(74) *Attorney, Agent, or Firm*—Cantor Colburn LLP

(57) ABSTRACT

A computer software system is provided, namely, An Object Process Graph Application Controller-Viewer (OPGACV) system. The OPGACV controls a running Object Process Graph (OPG) application by inducing a Dynamic Graph Interpreter (DGI) to transition applications from one state to another, and using application designer/user defined properties, it renders application state, structure, and data on display mediums and validates data inputs to applications. The OPGACV also controls the import and export of OPG applications.

20 Claims, 13 Drawing Sheets

U.S. PATENT DOCUMENTS

| | | | |
|---|---|---|---|
| 6,701,513 B1* | 3/2004 | Bailey | 717/109 |
| 6,708,179 B1 | 3/2004 | Arora | 707/102 |
| 6,957,404 B2* | 10/2005 | Geist et al. | 716/4 |
| 6,988,270 B2* | 1/2006 | Banavar et al. | 719/310 |
| 7,000,190 B2* | 2/2006 | Kudukoli et al. | 715/763 |
| 7,076,740 B2* | 7/2006 | Santori et al. | 715/771 |
| 7,137,100 B2* | 11/2006 | Iborra et al. | 717/106 |
| 7,181,686 B1* | 2/2007 | Bahrs | 715/526 |
| 2001/0018690 A1 | 8/2001 | Tung Ng et al. | 707/103 |
| 2001/0052108 A1* | 12/2001 | Bowman-Amuah | 717/1 |
| 2002/0184610 A1* | 12/2002 | Chong et al. | 717/109 |
| 2002/0194155 A1 | 12/2002 | Aldridge et al. | 707/1 |
| 2003/0172091 A1 | 9/2003 | Norcott | 707/203 |
| 2003/0200539 A1* | 10/2003 | Fu et al. | 717/161 |
| 2004/0025171 A1* | 2/2004 | Barinov et al. | 719/318 |
| 2004/0181544 A1 | 9/2004 | Anderson | 707/102 |
| 2005/0273773 A1* | 12/2005 | Gold et al. | 717/139 |
| 2006/0059461 A1 | 3/2006 | Baker et al. | |
| 2006/0085783 A1* | 4/2006 | Tsurugasaki | 717/125 |

FOREIGN PATENT DOCUMENTS

| | | |
|---|---|---|
| WO | WO 01/25915 A1 | 4/2001 |

OTHER PUBLICATIONS

Knight, Alan; Dai, Naci; "Objects and the Web", pp. 51-59, 2002 IEEE, retrieved Aug. 2, 2006.*

Liu, Chung-Shyan; "An Object-Based Approach to Protocol Software Implementation", pp. 307-316, 1994 ACM, retrieved Aug. 2, 2006.*

Wasserman, Anthony I; Pircher, Peter A; "A Graphical, Extensible Integrated Environment for Software Development", pp. 131-142, 1986 ACM, retrieved Aug. 2, 2006.*

Gomes, Fabian et al., "Simkit: A High Performance Logical Process Simulation Class Library In C++", pp. 706-713, ACM 1995.*

Taentzer, Gabriele; "Modeling Dynamic Distributed Object Structures by Graph Transformation", pp. 1-16, 1996, SIGS Publications, Inc., New York retrieved from URL <http://www.cs.tu-berlin.de/~gabi/oc9701.f.taentzer.html>.*

PCT Search Report PCT/US2005/022192 mailed Nov. 11, 2005.

D. J. Anderson; "Using MVC Pattern in Web Interactions;" [online]; [retrieved on Jul. 22, 2000]; retieved from the Internet at http://www.uidesign.net/articles/papers/.

"Struts User's Guide;" [online]; [retrieved on Jul. 25, 2001].

J. Rumbaugh; "State Trees as Structured Finite State Machines for User Interfaces;" Procedings of the ACM Siggraph Symposium on User Interface Software, 1998; pp. 15-29.

Koo, Hsueh-Yung Benjamin, "A Meta-Language for Systems Architecting"; Massachusetts Institute Of Technology, Jan. 2005, 168 pgs.

Borland Software Corporation, "User Guide for Together ControlCenter and Together Solo", Updated Mar. 24, 2004. XP-002374484.

Eisenbarth, Thomas, et al. "Static Trace Extraction", Proceedings of the Ninth Working Conference on Reverse Engineering. University of Stuttgart, Germany. IEEE Compute Society. WCRE 2002.

PCT Search Report PCT/US2005/032114. Date of Mailing: Apr. 19, 2006.

Reid G. Smith, et al., Impulse-86 A Substrate for Object-Oriented Interface Design, Sep. 1986 OOPSLA '86 Proceedings, pp. 167-176.

PCT Search Report for PCT/US2005/018942, Nov. 14, 2005.

David J. Anderson; "Using MCV Pattern in Web Interactions;" Internet Article Jul. 22, 2000, pp. 1-22.

"Strut's User's Guide;" Internet Article Jul. 25, 2001 pp. 1-5.

C. Russel; "Java Data Objects, JSR 12, Version 1.0.1;" Internet Article May 31, 2003, pp. 1-61.

A. Herbert et al., "A Graphical Specification System for User-Interface Design;" IEEE Software vol. 7 Jul. 1990 No. 4.

PCT Search Report PCT/US2005/021440 Sep. 21, 2005.

* cited by examiner

OBJECT PROCESS GRAPH APPLICATION CONTROLLER-VIEWER

CROSS-REFERENCE TO RELATED APPLICATION

The present application is related to copending application Ser. No. 10/908,654 entitled "Object Process Graph System" filed on May 20, 2005 by inventors Steven A. Gold, David M. Baker, Vladimir Gusev, and Hongping Liang and incorporated herein by reference in its entirety. In addition, the present application claims the benefit of provisional application No. 60/588,465 filed Jul. 16, 2004 which is herein incorporated by reference in its entirety.

BACKGROUND OF THE INVENTION

The present invention generally relates to user interfaces and, in particular, to a controller and view components of the Model-View-Controller (MVC) framework of object-oriented programming. An Object Process Graph (OPG) relates to the MVC model components. Object Process Graph (OPG) is described subsequently herein.

BACKGROUND

Since the development and acceptance of object-oriented programming technology and associated object-oriented languages like Smalltalk, C++ and JAVA, a number of application development frameworks have been developed. The Model-View-Controller framework is one of them. It defines a way of distributing the functionality of applications and creating reusable control functions that can be applied to a wide range of applications. Typically, the Model consists of persistent business objects that portray model data on a display medium; and the Controller consists of objects responsible for controlling the flow of information in an application.

The JAVA Server Page (JSP) Model 2 architecture is a recent application of the MVC to WEB applications. The JAKARTA Struts framework is an implementation of the JSP Model 2 architecture.

BRIEF SUMMARY OF THE INVENTION

The present invention is directed to object process graph application controller-viewers that satisfy these needs.

An aspect is an object process graph application controller-viewer, including an object process graph application viewer and an object process graph application controller. The object process graph application viewer receives information associated with an object process graph application and application states. The object process graph application viewer renders the object process graph application and application states on a display medium. The object process graph application controller processes user input. The object process graph application controller provides commands to a dynamic graph interpreter to transition the object process graph application from a first state to a second state. The object process graph application controller provides commands to the object process graph application viewer to display the object process graph application and application states.

Another aspect is a method of providing an object process graph application controller-viewer. The running of an object process graph application is controlled and a display of the object process graph application and its associated application states is rendered on a display medium.

Yet another aspect is a software product stored as instructions on a storage medium for performing a method of providing an object process graph application controller-viewer. Information associated with an object process graph application and application states is received. The object process graph application and application states are rendered on a display medium. User input is processed. The object process graph application is transitioned from a first state to a second state.

The present invention has many advantages, including enabling application developers, users and domain experts to change any aspect of OPG applications while the applications are running. Application information is rendered on display mediums. Application information inputs are validated based on user-defined properties that can be modified at any time. A means of importing and exporting OPG application descriptions is provided.

BRIEF DESCRIPTION OF THE SEVERAL VIEWS OF THE FIGURES

These and other features, aspects, and advantages of the present invention will become better understood with regard to the following description, appended claims, and accompanying Figures, where:

DETAILED DESCRIPTION OF THE INVENTION

One aspect of the present invention is an integration of an OPG Application Controller (OPGAC) and an Object Process Graph Application Viewer (OPGAV) with an OPG system (Object Process Graph (OPG) and Dynamic Graph Interpreter (DGI)) to form a Dynamic Model View Controller (DMVC) application structure. This dynamic application structure manifests running instances of OPG applications. Dynamic Graph Interpreter (DGI) is described subsequently herein. The OPGAC controls the running of applications by: processing input data, instructions/selections from users or other systems; initiating the display or output of information via the OPGAV, commanding the DGI to initiate application state transitions and controlling the import and export of OPG application descriptions. The OPGAC is the controller component of the DMVC.

The OPGAV is the view component of the DMVC. It receives display/output commands from the OPGAC to render application OPGs on a display media and/or output devices. The rendered OPGs provide a means of interacting with the applications via selection and input controls. They also display application state objects in their appropriate context and provide a way to view and update their content.

Another element of the DMVC, the OPG system, functions as the model component. It is integrated with the OPGAC and OPGAV. The OPG defines an application's complex processing steps and data and provides storage for an application's persistent and transient data. The DGI provides the functions invoked by the OPGAC and OPGAV to run an OPG-defined application.

Figure 1:
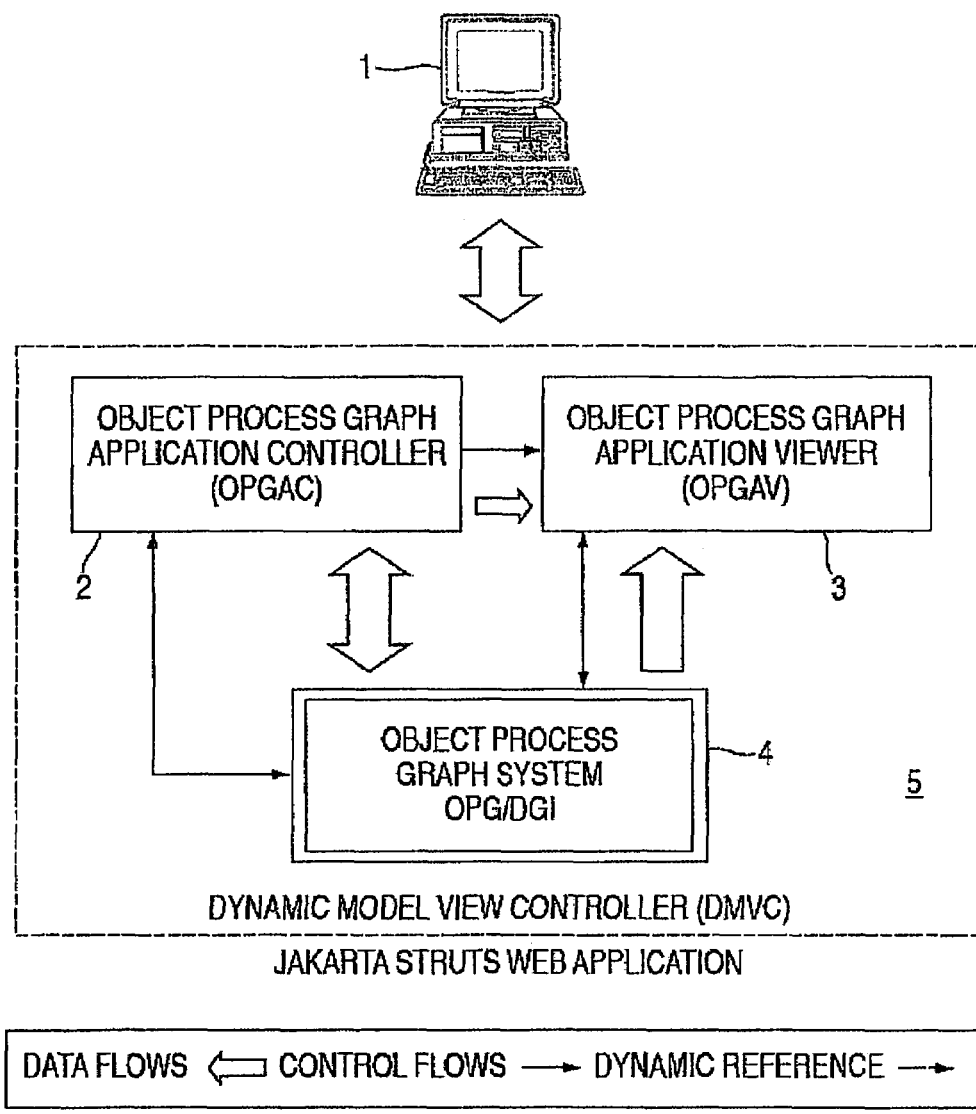
FIG. 1 is a block diagram showing an overview of a system according to embodiments of the present invention.

One exemplary embodiment of the invention (FIG. 1) integrates the OPGAC 2 and OPGAV 3 with the OPG system 4 to form a Dynamic Model View Controller (DMVC) 5 application structure based on the JAKARTA Struts WEB application framework. The DMVC is capable of providing a display on a computing device, such as a personal computer (PC) 1. Other technologies incorporated in this exemplary embodiment include Cascading Style Sheets (CSS), Dynamic HTML (DHTM), JAVA Document Model (JDOM), JAVA Server Pages (JSPs), Struts Tiles, etc. Of course, other embodiments may be implemented with various other application frameworks and technologies.

Object Process Graph Application Controller (OPGAC)

Figure 2:
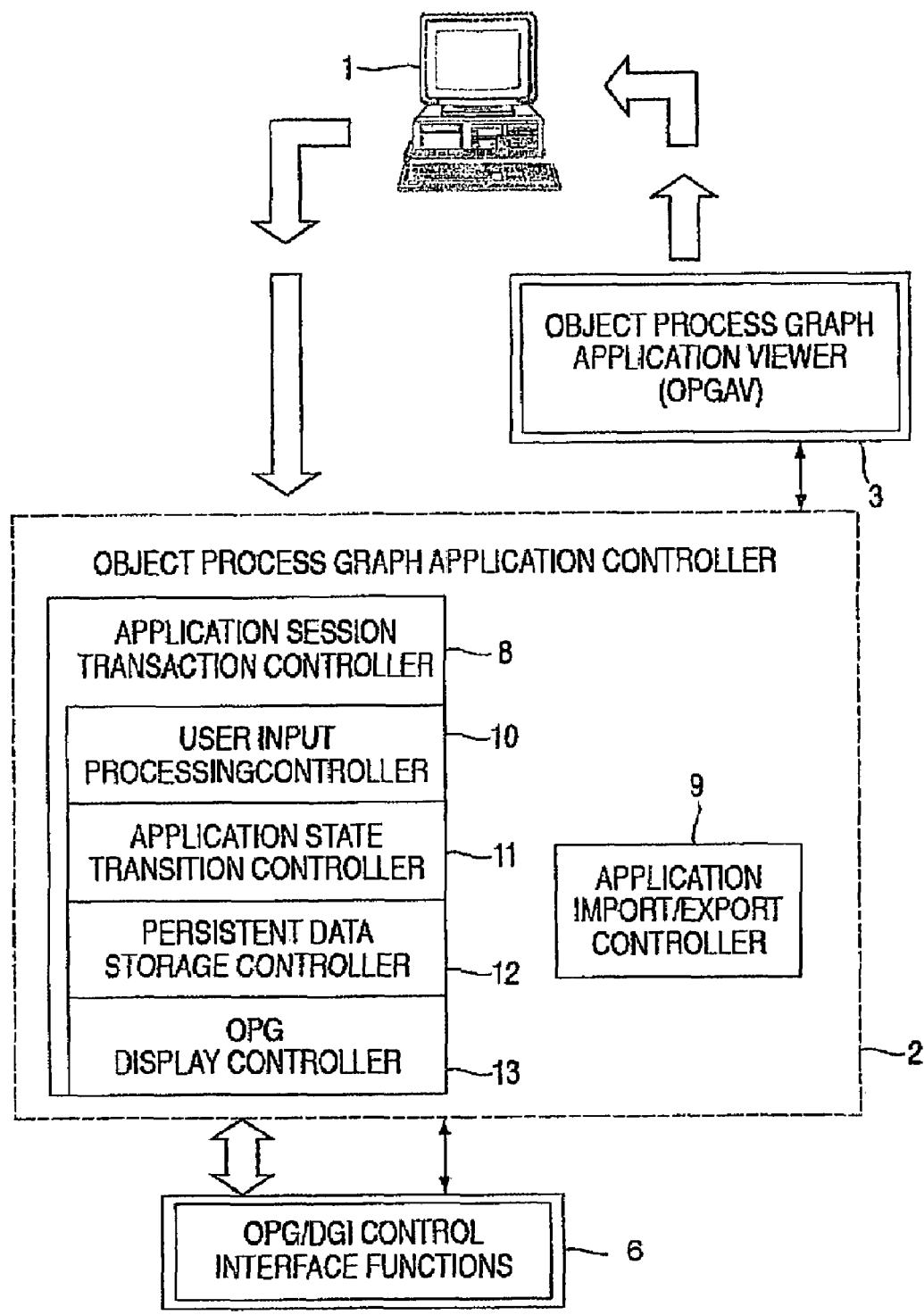
FIG. 2 is a block diagram showing an Object Process Graph Application Controller according to embodiments of the present invention.

One embodiment of the OPGAC (FIG. 2) 2 includes two groups of functions: an Application Session Transaction Controller 8 and an Application Import/Export Controller 9. The Application Session Transaction Controller 8 includes four functional areas that interact with the OPG system 4 to run OPG-defined applications: User Input Processing 10, Application State Transition Controller 11, Persistent Data Storage Controller 12 and OPG Display Controller 13. In exemplary embodiments of the present invention, the Application Import/Export Controller 9 function imports and exports XML descriptions of OPG-defined applications.

In this exemplary embodiment, the OPGAC 2 control functions are implemented with Struts-based Action and Form classes. The Action classes interpret user selections, instructions and input data and interact with and command the DGI 6 to update application state objects, perform state validations. Also, based on application state objects and process control objects in an application's OPG, the OPGAC 2 instructs the DGI 6 to associate the application state with the next active operations. Performing these functions is similar to running a traditional software application. The Form classes implement standard JAVA Bean interface access to OPG data objects and provide access to user input data for evaluation by the OPGAC 2.

Application Session Transaction Controller

Figure 3:
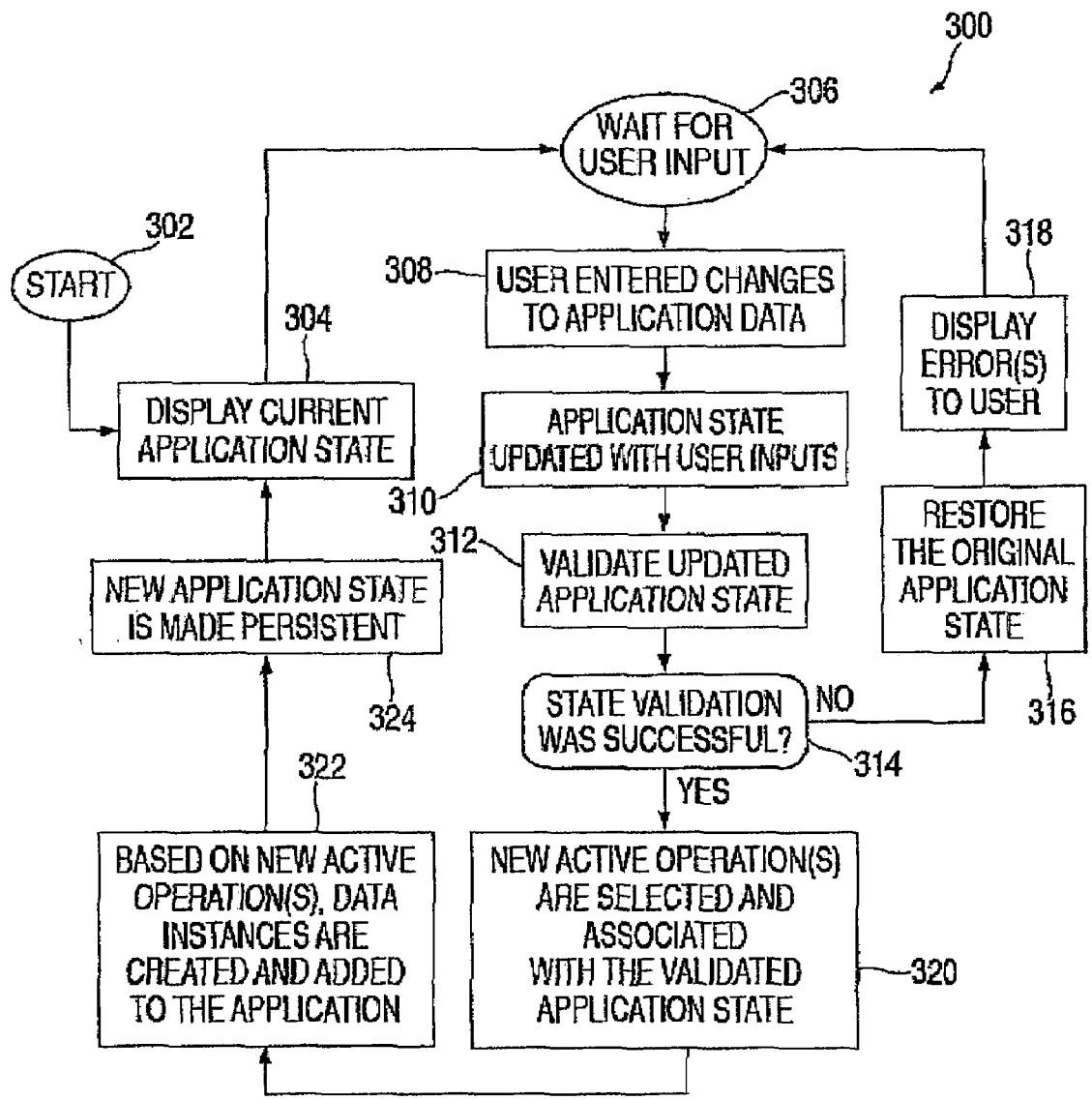
FIG. 3 is a flow chart of exemplary Application Session Transaction Control flow according to embodiments of the present invention.

The Application Session Transaction Controller 8 function implements the exemplary embodiment of the Basic Application Session Transaction control Flow at 300 depicted in FIG. 3. This overview of the exemplary method shown in FIG. 3 begins at Start at 302 and then flows to Display Current Application State at 304. The control flows in loops, each time returning to Display Current Application State at 304. After Display Current Application State at 304, is Wait for User Input at 306, User Entered Changes to Application Data at 308, Application State Updated with User Inputs at 310, Validate Updated Application State at 312, and then it is determined whether State Validation was Successful at 314. If not, control flows to Restore the Original Application State at 316, Display Error(s) to User at 318, and back to Wait for User Input at 306. Otherwise, if State Validation was Successful at 314, control flows to New Active Operation(s) are Selected and Associated with the Validated Application State at 320, Based on New Active Operations(s) Data Instances are created and added to the Application at 322, New Application State is Made Persistent at 324, and back to Display Current Application State at 304.

Figure 4:
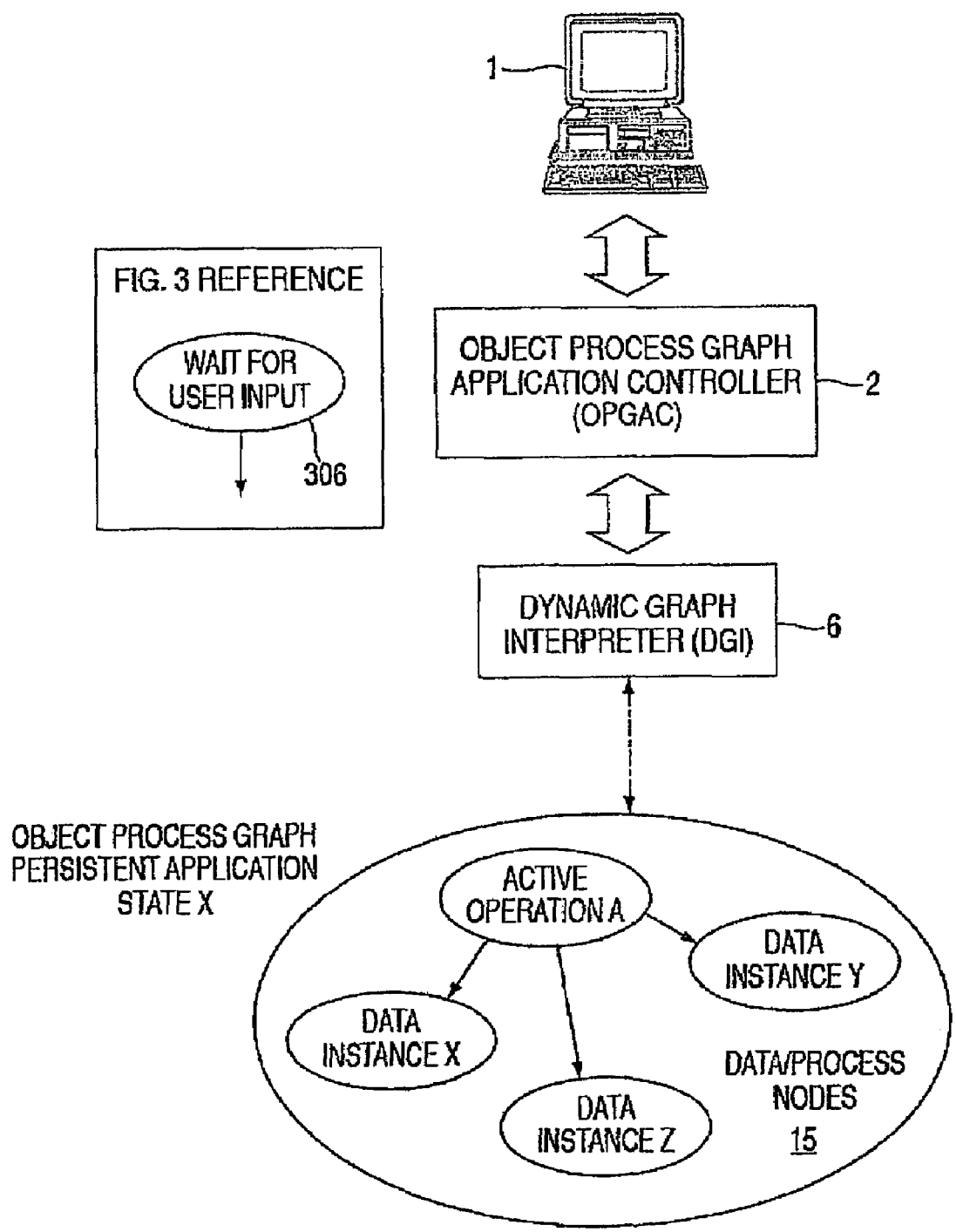
FIG. 4 is a block diagram showing an exemplary method of Waiting for User Input according to embodiments of the present invention.

FIGS. 4 through 10 describe in more detail the basic flow shown of FIG. 3, for embodiments of the present invention. FIG. 4 begins after the OPGAV 3 (described below) has displayed a view of an application's OPG and associated application state objects at 304, and the system is waiting for input from a user at 306. The current application state is X 15, which includes Data Instance X, Y and Z. Values from these instances are displayed to the user by the OPGAV 3 in the appropriate place within the OPG. In this example, the display is provided on the PC 1 using the OPGAC 2 and the DGI 6.

Figure 5:
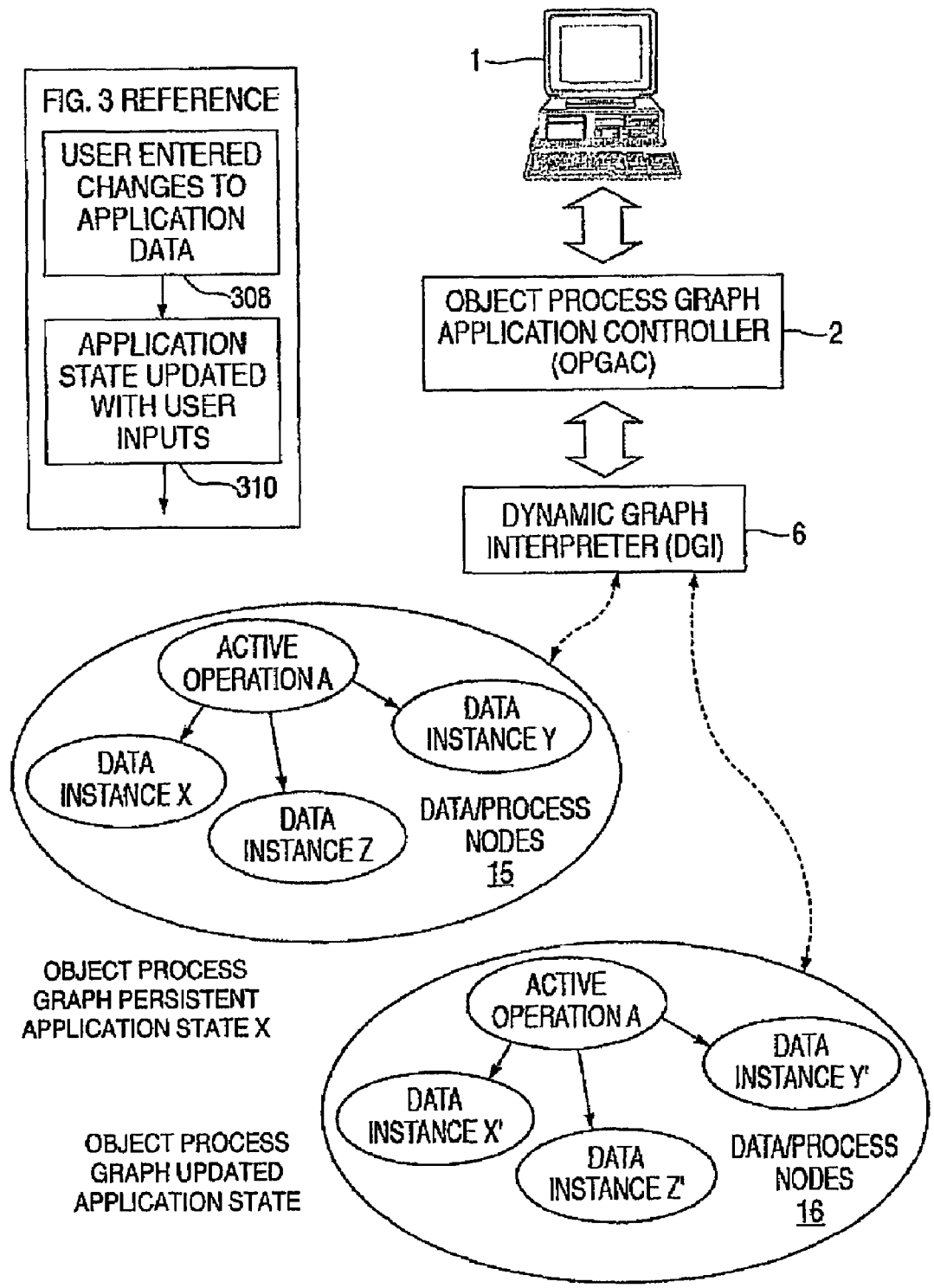
FIG. 5 is a block diagram showing an exemplary method of User Entered Changes and Application State Updating according to embodiments of the present invention.

FIG. 5 shows the state of the application after the user has entered data at 308 and the OPGAC 2 has commanded the DGI 6 to update the application state with the user's inputs at 310. The updated application state 16 has new Data Instance values X', Y' and Z'. At this point, the updated application state 16 is a trial state that has not been validated.

Figure 6:
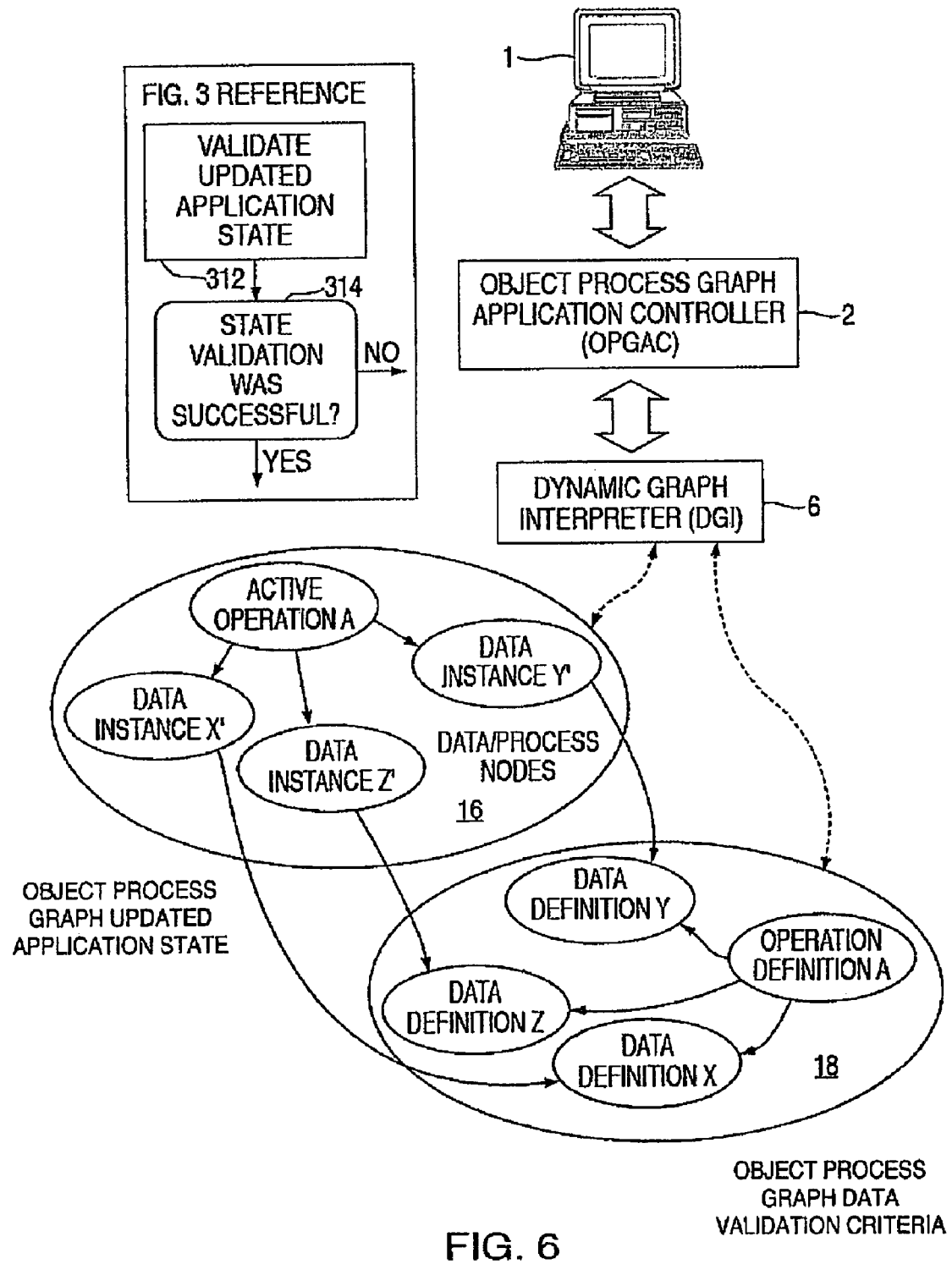
FIG. 6 is a block diagram showing an exemplary method of Validating an Updated Application State according to embodiments of the present invention.
Figure 7:
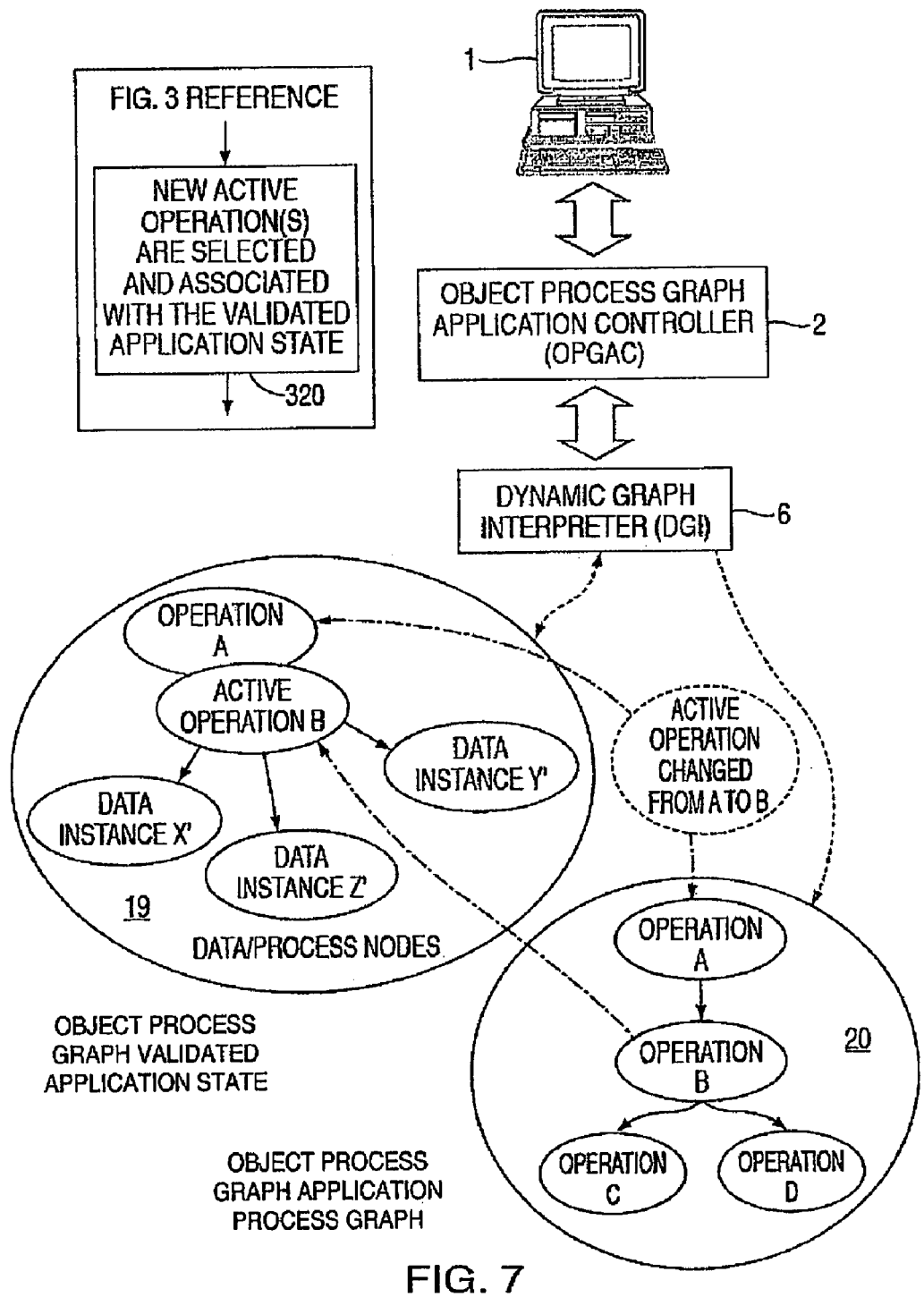
FIG. 7 is a block diagram showing an exemplary New Operation Associated with a Validated Application State according to embodiments of the present invention.

FIG. 6 shows the application state 16 being validated by the DGI 6 in response to an OPGAC 2 command. It uses validation criteria 18 for the Data Instances in the OPG system 4. Various validations are used, such as value range tests, type checking, etc. If the validation is successful at 314, the OPGAC 2 proceeds to the next step 320 in the basic flow as depicted in FIG. 7. If the validation is not successful at 314, the OPGAC 2 commands the DGI 6 to restore the original application state at 316 and commands the OPGAV 3 to create and display appropriate error messages at 318.

In FIG. 7, the OPGAC 2 has commanded the DGI 6 to perform application steps defined in the application's OPG definition 20. In this example, the DGI 6 found that Operation B is the next operation, and it has associated Operation B with the validated application state 19 at 320.

Figure 8:
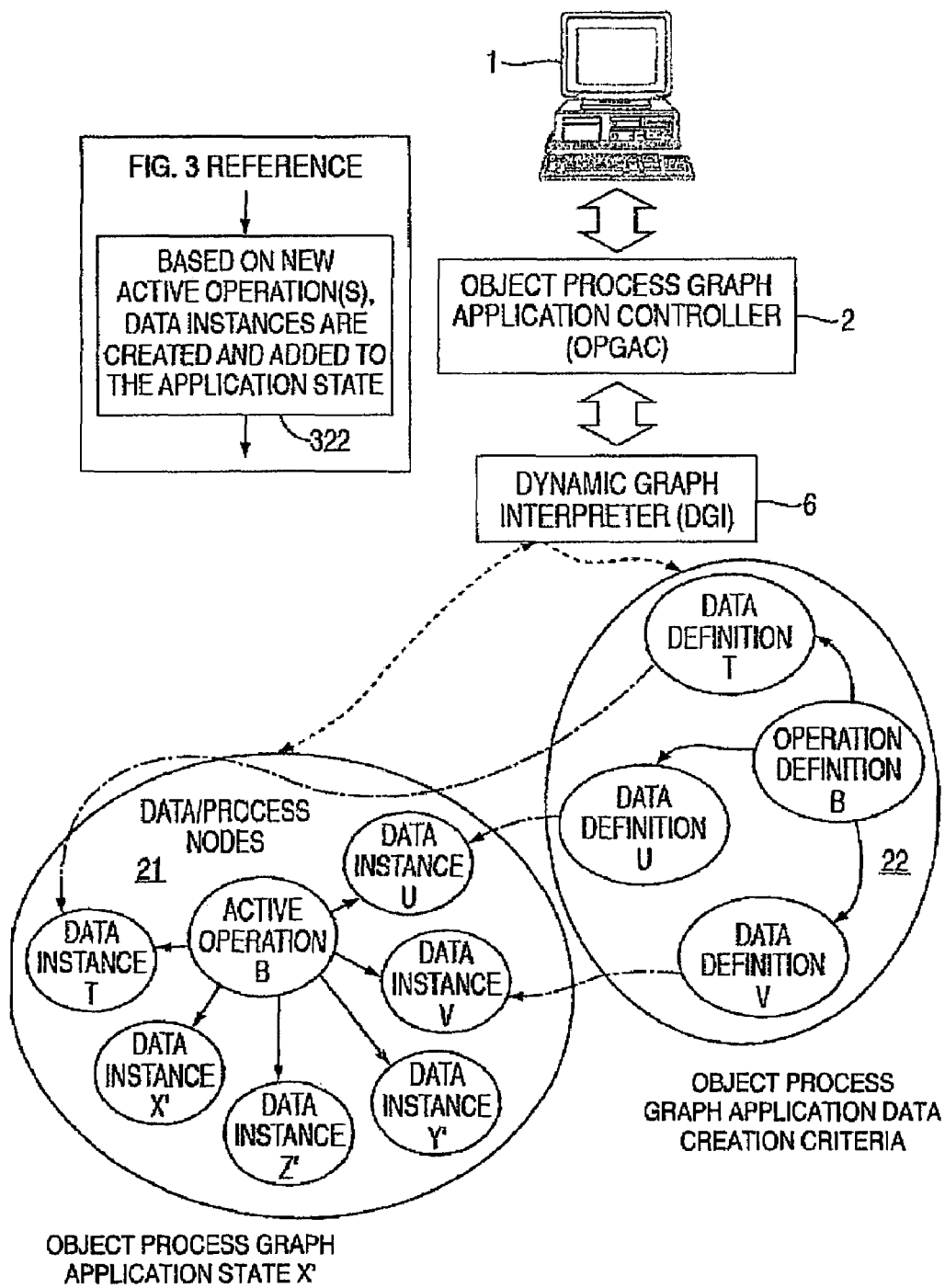
FIG. 8 is a block diagram showing an exemplary method of New Data Instances Added to an Application State according to embodiments of the present invention.

In FIG. 8, the DGI 6 completes the association of Operation B with the validated Application State 21 by creating Data Instances T, U and V defined by Operation B in the OPG 22 and adding them to the application state at 322. The OPG system 4 initializes the Data Instances with default values defined in the OPG system 4. The validated Application State 21 is renamed X'.

Figure 9:
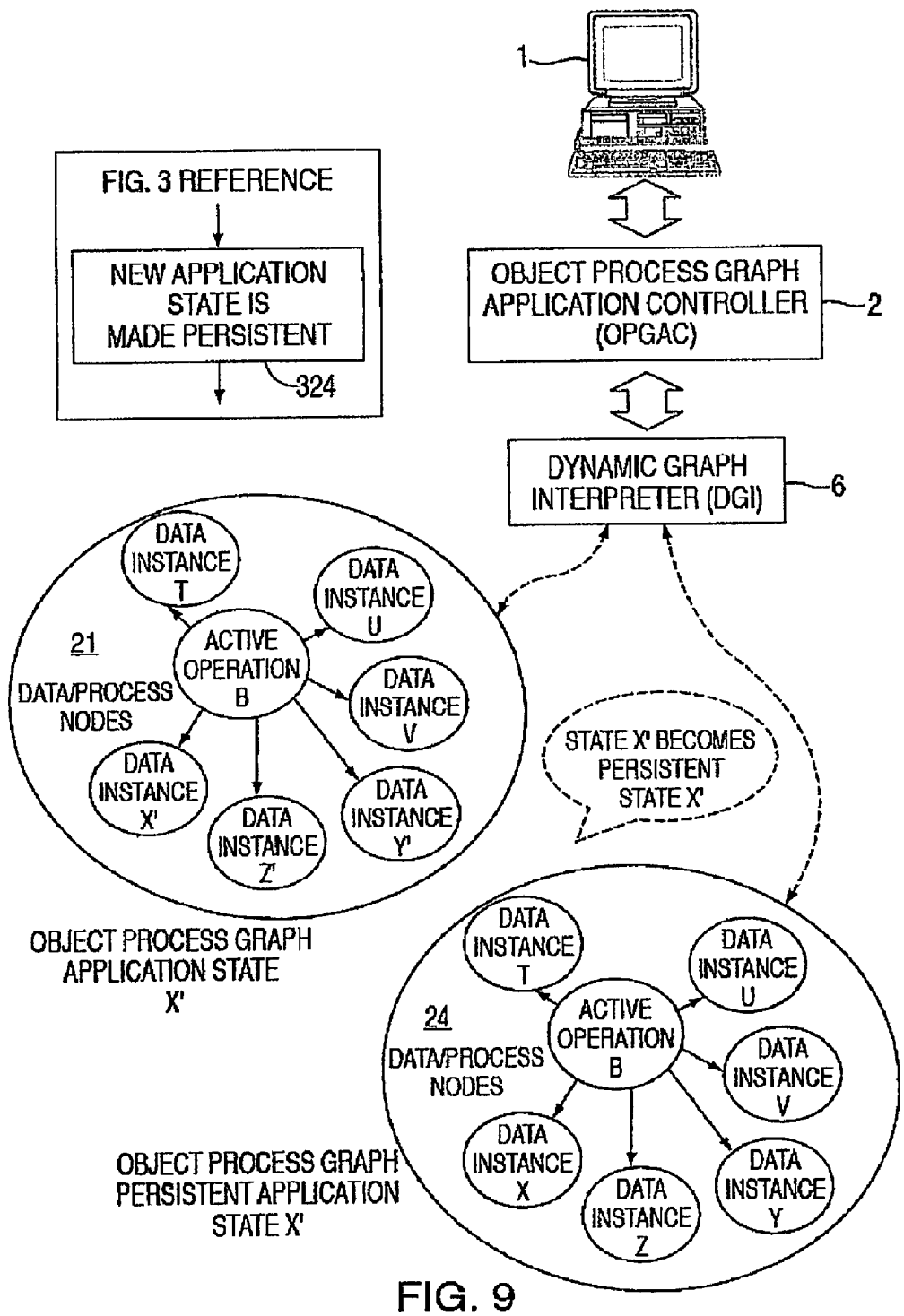
FIG. 9 is a block diagram showing an exemplary method of an Application State that Becomes Persistent according to embodiments of the present invention.

In FIG. 9, the OPGAC 2 commands the DGI 6 to make the application state 21 a persistent Application State 24 at 324. This means that the state is preserved in a database.

Figure 10:
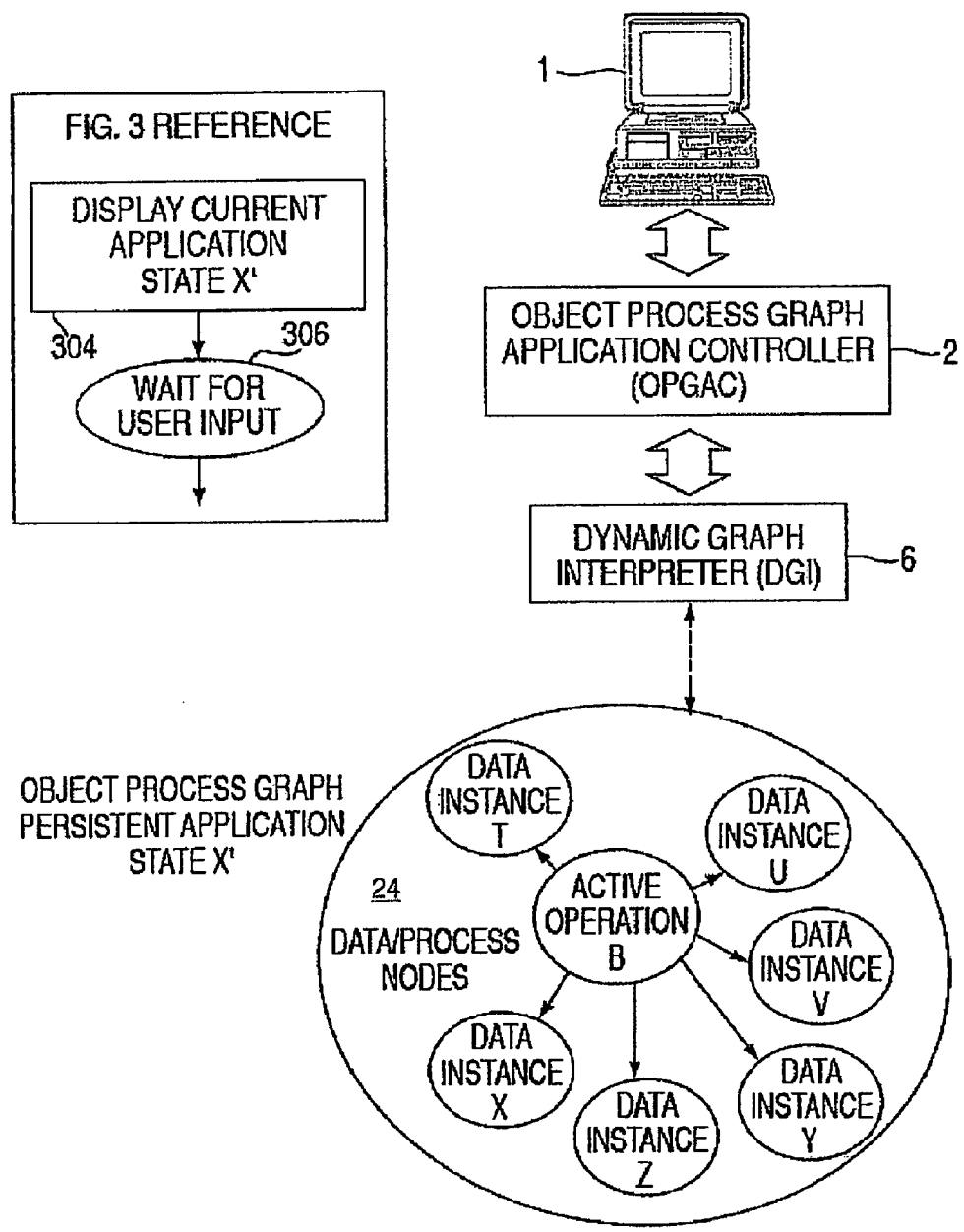
FIG. 10 is a block diagram showing another exemplary method of Waiting for User Input according to embodiments of the present invention.

Finally, in FIG. 10, the OPGAC 2 commands the OPGAV 3 to display Application State 24 at 304 to the user. At this point in the example, the OPGAC 2 has completed a loop of the basic flow shown in FIG. 3 and will return to waiting for a user to request changes to the application's OPG at 306.

Application Import/Export Control

Figure 11:
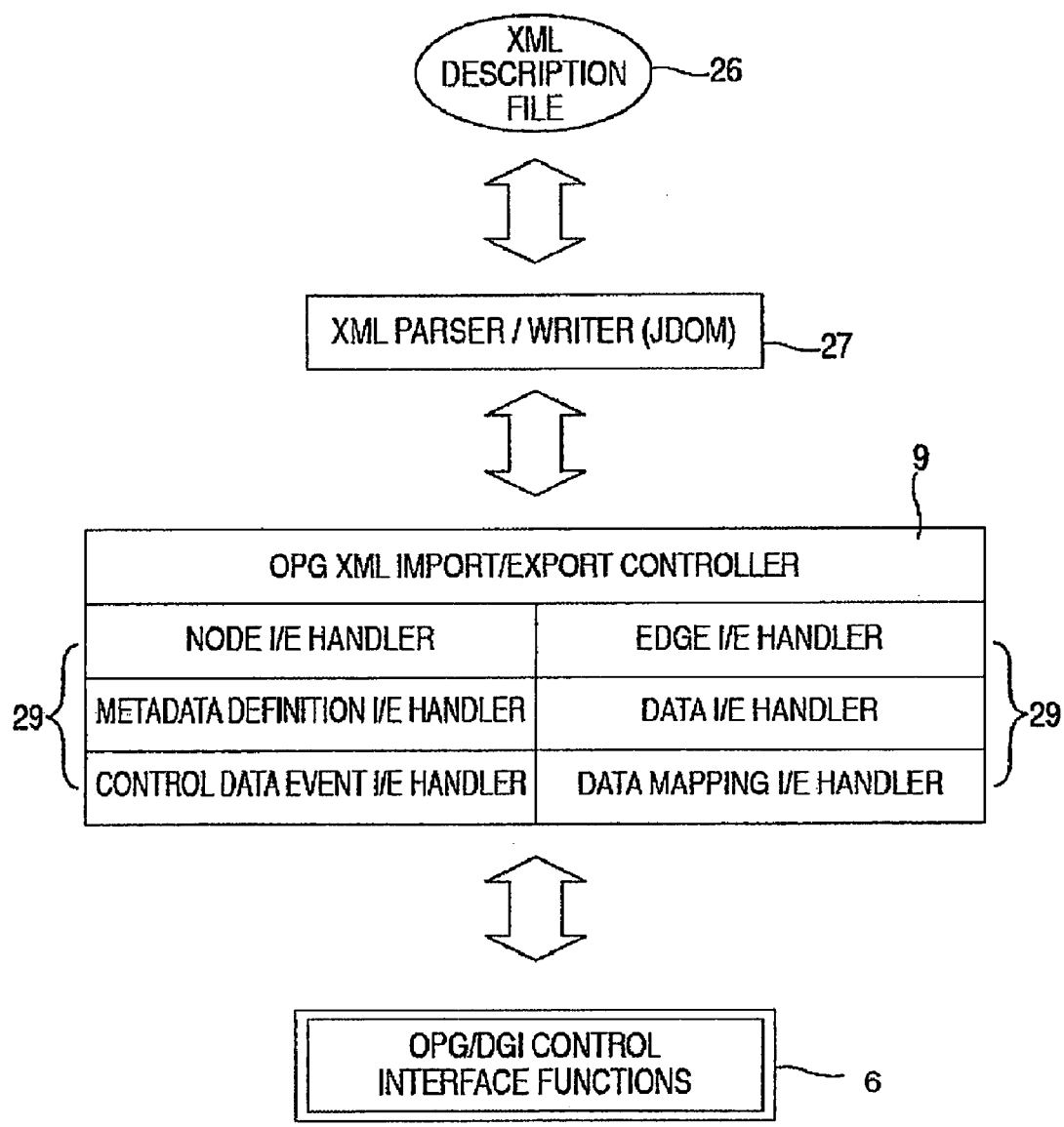
FIG. 11 is a block diagram showing exemplary Application Import/Export Control Components according to embodiments of the present invention.

The OPGAC 2 uses the Application Import/Export Controller 9 function to load and store XML descriptions of OPG-defined applications. One embodiment of the invention (FIG. 11) includes an OPG XML Import/Export Controller 9 and a group of Import/Export handlers 29, one for each of selected areas of an OPG-defined application program graph. It uses the JAVA Document Model (JDOM) 27 to parse (for importing) or write (for exporting) XML files 26. Elements of an application are retrieved from the OPG system 4 by the DGI 6, which is tightly coupled to the Import/Export Handlers 29.

In addition to application descriptions, the OPGAC 2 can import and export descriptions of application elements including: operations, relationships, data events, etc.

Object Process Graph Application Viewer (OPGAV)

Figure 12:
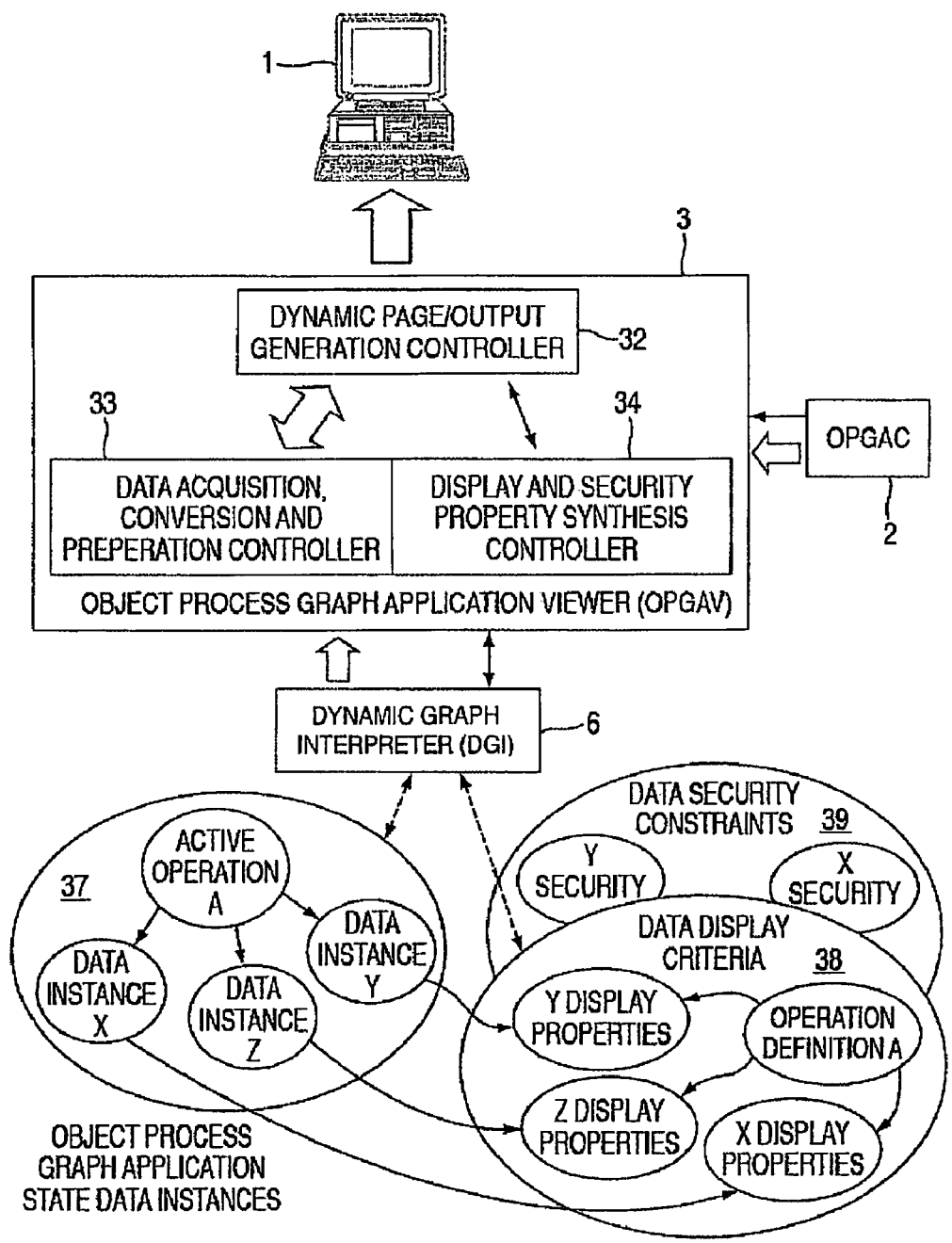
FIG. 12 is a block diagram showing an exemplary Object Process Graph Application Viewer according to embodiments of the present invention.

One exemplary embodiment of the OPGAV (FIG. 12) 3 includes three functions: Dynamic Page and/or Output Generation 32, Data Acquisition, Conversion and Preparation 33 and Display and Security Property Synthesis 34. This exemplary embodiment renders OPG-defined application data on standard WEB browsers as WEB pages and/or generates output data for other systems. In this exemplary embodiment, the WEB pages are implemented with Java Server Pages (JSPs CSS, JDOM and DHTML. The JSPs access OPG-defined application data through Form objects and JSP tag library objects that interact with the DGI 6.

The DGI 6 retrieves application OPG elements in response to commands from the Data Acquisition, Conversion and Preparation functions 33. The data is converted to OPG-defined display formats and prepared for incorporation in HTML pages.

The DGI 6 provides display properties 38 and security constraints 39 stored in the OPG application state data instances 37 for every primitive data element. Primitive data display properties include the position on a display where an element will be rendered, the length and height of the element, etc. Security constraints include whether or not an element should be displayed or whether or not it can be edited, etc.

Figure 13:
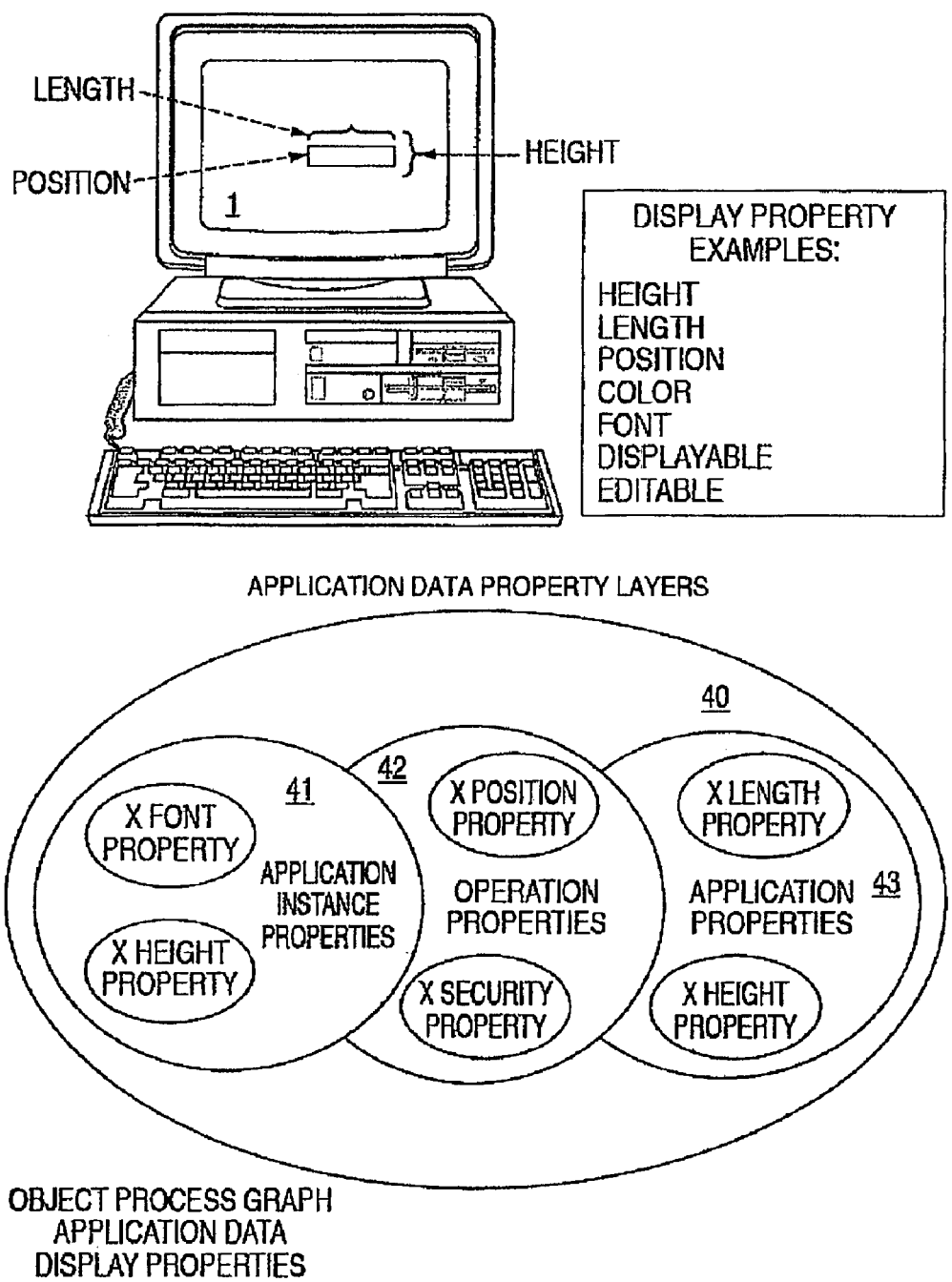
FIG. 13 is a block diagram showing exemplary Object Process Graph Application Data Properties according to embodiments of the present invention.

Display and security properties can be defined at three levels (FIG. 13) 40: Application 43, Operation 42 and Application Instance 41, in this exemplary embodiment. Application Instance 41 properties have the highest priority. If present, they supersede Application 43 and Operation 42 properties. Operation properties 42 have the next highest priority. If present, they supersede Application properties 43. Application Instance properties 41 apply to application data for a single instance of running an application. Operation properties 42 apply to all instances of running an application but just within the context of a particular Operation. Application properties 43 apply within the context of an application, i.e. to all instances of an application. The Display and Security Property Synthesis function determines which properties to use based on the current state (context) of an application instance.

The OPGAV 3 provides a dynamic user interface for OPG-defined applications. It renders display pages and input forms based on user, developer or domain expert defined properties in an application's OPG. The properties can be changed at any time and take affect immediately, i.e. the OPGAV 3 uses the latest properties to display an application's OPG.

An Object Process Graph Application Controller—Viewer Method and an Exemplary Embodiment Following is a description of an exemplary embodiment of a method of creating an exemplary embodiment of Object Process Graph Application Controller-Viewer Method system, which was defined and described above. 1) Assuming the existence of an embodiment of an Object Process Graph System 4 to which an embodiment of an OPGACV 3 is to be added, choose an initial set of hardware/operating system platforms, programming frameworks, database and/or file systems and display mediums (e.g., display devices) upon which to build and run the OPGACV 3 system, which is the same as or compatible with that used to build the OPG system 4 embodiment. Object Process Graph System is described subsequently herein. In one embodiment, the LINUX operating system, running on Intel based server hardware over an Intranet, connected to Intel based PC's running MICROSOFT WINDOWS XP software was used. The JAVA programming language from Sun Microsystems was used to program the OPGACV 3 system. This embodiment may run on either the TOMCAT application server running locally under the WINDOWS XP operating system or on a remote LINUX server running TOMCAT. The ECLIPSE development platform from the ECLIPSE Foundation along with the MYECLIPSE plug-in from Genuitec may be used to do the JAVA software development. Note that the above operating systems, application platforms and programming languages tools represent just one of many possible configuration of development and operational systems that can be used to create and run the exemplary embodiment.

2) Using the summary and description of the invention above, along with the accompanying FIGS. 1-13, define a set of classes and an appropriate class hierarchy that will encompass the functionality required. The design patterns described in "Design Patterns" by Gamma et al, Addison Wesley 1995 and "Patterns in Java" by Grand, Wiley Computer Publishing 1998 may be useful in creating a set of classes with the needed functionality. A high level CASE tool for the definition of these classes may also be used. Some classes that could be defined are:

a. An abstract class that extends the Struts Action class can be defined that implements the basic control flow described in FIG. 3. Additional classes that extend this class to provide the following application functions may also be defined: user logon/logoff, security administration (new users, user rights, etc.), data import/export, audit, reporting and transaction control (start, edit, merge, etc.). These classes provide the functions of the OPGAC 2, viz. User Input State Change, Application State Transition and Application Display Control.

b. A set of classes that provide OPG-defined application import/export functions.

c. Based on the Struts framework define JSP layouts (templates) for basic application pages e.g. user logon/logoff, security administration, data import/export, audit, reporting, transaction control, etc. Define JSP tile components for standard regions of the layouts, e.g. header, body, footer, title, etc.

d. A set of JSP tag classes and Struts Form classes that implement OPG access via the DGI 6, perform data property synthesis and dynamic page generation functions.

e. A set of CSS definitions that provide attributes for window components that can be updated by Java Script function running on a WEB browser.

The above program and classes may include both inner classes and some first class objects to provide specific functionality. None of these classes are persistent.

Object Process Graph Description

Object Process Graph (OPG) is the definition component of the Object Process Graph System (OPGS), a complete application development and execution environment. Other components include a Dynamic Graph Interpreter (DGI) that interprets or executes applications defined by OPGs and a graphical user interface for creating and modifying OPGs.

Embodiments of the OPG may be considered a computer language (it is Turing complete) that is interpreted as the program is executed. An OPG is stored in transient and persistent computer memory. An OPG can hold any data structure, which includes, but is not limited to: relational tables, hierarchical tables, n-dimensional data arrays, spreadsheets, graphical models and 3-D physical models. These data structures are not stored as blobs, which is common in relational database systems, but in special OPG structures that reflect their original structure and internal relationships. OPG process and control structures provide control over the order and timing of persistent and transient data validation, transformation and display within an application. OPG structures can also define mathematical formulas, regular expressions (in the case of textual data or mixed quantitative and textual data) and complete algorithms.

An application's OPG can be rendered on a computer terminal or static output medium, e.g. paper. OPG data, process and control structures displayed on an interactive medium can be edited. Unlike traditional software development systems, editing an application's OPG does not generate code that must be compiled and installed. Instead, changes are made and take affect immediately. Changes can even be made while the DGI is interpreting (running the application). The ability to safely change an application at any time is desired for rapid development and the long-term maintenance of large, complex enterprise-wide application systems.

All application execution state information in an OPG is held in Application State objects. The DGI acts on the OPG by changing the application state information it holds. Application state information can include any persistent data object. A DGI may operate on multiple application states concurrently, merging or splitting state information between combinations of application state objects.

An OPG maintains audit trail information for all persistent and transient data changes in an application—at the primitive data level. Audit trail information is readily available for display on a user interface, via display controls or for further update and manipulation in an application's process and data flows.

Audit information defining changes made in long and short transactions is maintained and tracked for all changes to the persistent data of an application. Long transactions enable the system to organize, control and track changes to all persistent data. Such changes can take place over an extended period of time (days or weeks) over many work sessions. Short transactions, on the other hand, are made during a single user session or interaction with the system. Long and short transaction information is immediately available for manipulation and display within the application, via a system's graphical user interfaces. Tracking long transactions also facilitates rollbacks to any point in a transaction and deletions of a transaction (with audit trails) are automatically available via the application interface. Control of access to all functionality and data within the application by users is available through the system interface. This includes separate access rights (read, write, rollback) for each primitive data item defined as part of an application for each user.

In addition to data entered or changed via a user interface, an embodiment of the system also accepts input data to application processes in any digital format from other systems.

Some embodiments include a graphical user interface. A graphical user interface can enable a user to specify the format of all input that is then automatically parsed and used to update an application—adding to or modifying persistent data in the database or transient data in the application or display interfaces—at any point in the application process.

Output data may likewise be created in any format from any point in an application (for persistent or transient data), using the inverse of the above process in various embodiments. In some embodiments, external databases, such as relational databases, may be registered with an application, and all persistent data within the application may be stored in or retrieved from such databases.

Embodiments of the Object Process Graph component of the present invention extend the basic functionality of traditional graph object-oriented databases. Embodiments of the present invention synthesize the functionality of dynamic process elements and graph object oriented databases into a single integrated system, which makes it possible to rapidly create complete, complex enterprise wide applications without a traditional programming language. An OPG is directly and dynamically interpreted, therefore no code generation is required. The ease of changing an OPG and the immediate feedback resulting from changes greatly simplifies maintaining and changing OPG based applications.

Although the present invention has been described in considerable detail with reference to certain embodiments, other embodiments are possible. For example, different operating systems, programming languages, and software architectures may be used to practice embodiments of the present invention. Therefore, the spirit and scope of the appended claims should not be limited to the description of the embodiments contained herein.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. An object process graph application controller-viewer system, comprising:
   a computing device, storage medium, and display medium;
   an object process graph for defining an object process graph application, said object process graph including process and control structures for control over an order and a timing of data validation, transformation and display, said object process graph being dynamic, directed and cyclical, and said object process graph including at least one data node, at least one process node, and at least one application state node for defining application states;
   a dynamic graph interpreter for interpreting said object process graph to execute said object process graph application, said object process graph capable of being changed while being interpreted by said dynamic graph interpreter;
   an object process graph application viewer for receiving information associated with the object process graph application and the application states and for rendering said object process graph application and said application states on a display medium; and
   an object process graph application controller for processing user input, wherein said user input is validated against validation criteria upon which the application states are modified on successful validation and restored on unsuccessful validation, for providing commands to the dynamic graph interpreter to transition said object process graph application from a first application state to a second application state, and for providing commands to said object process graph application viewer to display said object process graph application and said application states.

2. The object process graph application controller-viewer of claim 1, wherein said object process graph application viewer is capable of applying security constraints to said object process graph application and said application states.

3. The object process graph application controller-viewer of claim 1, further comprising:
   an application session transaction controller for processing input data, for providing commands to said object process graph application viewer to render said object process graph application and said application states, and for transitioning said object process graph application transition from said first state to said second state.

4. The object process graph application controller-viewer of claim 3, wherein said input data includes instructions or selections.

5. The object process graph application controller-viewer of claim 1, wherein said application session transaction controller is capable of making an updated application state persistent.

6. The object process graph application controller-viewer of claim 1, wherein said application session transaction controller is capable of commanding said dynamic graph interpreter to validate and update said object process graph application and said application states.

7. The object process graph application controller-viewer of claim 1, further comprising:
   an application import/export controller for loading and storing descriptions associated with said object process graph application.

8. The object process graph application controller-viewer of claim 1, wherein said object process graph application viewer includes:
   a dynamic output generation controller for rendering said object process graph application and said application states on said display medium;
   a data acquisition conversion and preparation controller for providing commands to said dynamic graph interpreter to retrieve and convert said object process graph application and said application states to predetermined formats; and
   a display and security property synthesis controller for applying security constraints and display properties to said object process graph application and said application states.

9. The object process graph application controller-viewer of claim 1, wherein said security constraints are context-oriented.

10. A method of providing an object process graph application controller-viewer for creating and executing an application program in an object process graph system, the method comprising:
    controlling a running of an object process graph application, the object process graph application defined by an object process graph, said object process graph including process and control structures for control over an order and a timing of data validation, transformation and display, said object process graph being dynamic, directed and cyclical, and said object process graph including at least one data node, at least one process node, and at least one application state node for defining the application states, said running performed by a dynamic graph interpreter for interpreting said object process graph to execute said object process graph application, said object process graph capable of being changed while being interpreted by said dynamic graph interpreter;
    processing input data, wherein said input data is validated against validation criteria upon which the application states are modified on successful validation and restored on unsuccessful validation; and
    providing a display of said object process graph application and associated application states on a display medium.

11. The method of claim 10, wherein said controlling includes:
    initiating said display;
    providing commands for initiating application state transitions; and
    controlling import and export of object process graph application descriptions.

12. The method of claim 10, wherein said input data includes instructions or selections.

13. The method of claim 10, wherein said providing a display includes:
receiving commands for said display;
providing a means of interacting with said object process graph application and said application states via said input data; and
displaying said application states in a context.

14. A software product stored as instructions on a storage medium for performing a method of providing an object process graph application controller-viewer, the method comprising:
receiving information associated with an object process graph application and application states, the object process graph application defined by an object process graph, said object process graph including process and control structures for control over an order and a timing of data validation, transformation and display, said object process graph being dynamic, directed and cyclical, and said object process graph including at least one data node, at least one process node, and at least one application state node for defining the application states, said running performed by an interpreter for interpreting said object process graph to execute said object process graph application, said object process graph capable of being changed while being interpreted by said dynamic graph interpreter;
rendering said object process graph application and said application states on a display medium;
processing user input, wherein said user input is validated against validation criteria upon which the application states are modified on successful validation and restored on unsuccessful validation; and
transitioning said object process graph application from a first state to a second state.

15. The method of claim 14, wherein said user input includes instructions or selections.

16. The method of claim 14, further comprising:
making an updated application state persistent.

17. The method of claim 14, further comprising:
validating and updating said object process graph application and said application states.

18. The method of claim 14, further comprising:
loading and storing descriptions associated with said object process graph application.

19. The method of claim 14, further comprising:
formatting said object process graph application and said application states.

20. The method of claim 14, further comprising:
applying context-oriented security constraints to said object process graph application and said application states.

* * * * *